United States Patent [19]

Whinnett

[11] Patent Number: 5,586,143
[45] Date of Patent: Dec. 17, 1996

[54] APPARATUS AND METHOD FOR PROCESSING DATA SIGNALS IN A DIGITAL RECEIVER

[75] Inventor: Nicholas W. Whinnett, London, United Kingdom

[73] Assignee: Motorola, Inc., Schaumburg, Ill.

[21] Appl. No.: 499,978

[22] Filed: Jul. 10, 1995

[30] Foreign Application Priority Data

Jul. 22, 1994 [GB] United Kingdom ............. 9414823

[51] Int. Cl.⁶ ....................................... H03D 3/22
[52] U.S. Cl. ..................... 375/229; 375/230; 375/232; 364/724.01; 364/724.19; 364/724.2; 333/28 R
[58] Field of Search ..................... 375/229, 230, 375/231, 232, 355–358; 364/724.01, 724.16–724.19, 724.2, 825; 333/18, 28 R

[56] References Cited

U.S. PATENT DOCUMENTS 5,268,930  12/1993  Sendyk et al. .................. 333/18
5,283,531  2/1994   Serizawa et al. ................ 375/232
5,337,025  8/1994   Polhemus ......................... 333/28 R

FOREIGN PATENT DOCUMENTS 2273228  6/1994  United Kingdom ............. H04L 1/20

Primary Examiner—Stephen Chin
Assistant Examiner—Thuy-Lieu Nguyen
Attorney, Agent, or Firm—Daniel C. Crilly

[57] ABSTRACT

An apparatus and method as shown in for processing digital signals in a communications system including a non-equaliser detector and a equaliser each for receiving an input signal and outputting a quality estimate and bit decision, respectively, so that the quality estimates are compared and a bit decision is made based on the comparison. The apparatus and method further include retraining the equaliser based on the comparison of the quality estimates of the detector and equaliser.

12 Claims, 4 Drawing Sheets

RE-TRAINING RECEIVER STRUCTURE

BER IMPROVEMENT FOR T/4 CHANNEL (50 uS DELAY)

BER IMPROVEMENT FOR T/2 CHANNEL (100 uS DELAY)

FRAME AND SUB-BLOCK DEFINITION:

APPARATUS AND METHOD FOR PROCESSING DATA SIGNALS IN A DIGITAL RECEIVER

FIELD OF THE INVENTION

This invention relates in general to an apparatus and method for processing data signals in a receiver in a communications system, and more particularly to an apparatus and a method employing a non-equaliser detector and an equaliser in the receiver.

BACKGROUND OF THE INVENTION

In digital communications systems equalisers are used to compensate for multipath delay where the same signal is propagated over a number of different paths. In simulcast systems, such as Motorola's ASTRO/APCO simulcast systems, the same signal information is transmitted from multiple transmitters to increase coverage.

In a digital transmission consisting of a series of frames, each frame containing a number of known training symbols followed by a number of data symbols, a training sequence is used to initialise the settings of the equaliser. The correct settings depend on the state of the multipath channel and vary in time due to fading. An equaliser must continue to adjust its settings during the data block if the channel changes are significant during the frame. Such equalisers are referred to as adaptive. In TDMA systems such as USDC and TETRA, the number of data symbols over which the equaliser must adapt is of the order of 100. In ASTRO, the number is over 800.

For an adaptive equaliser, the bit error rate tends to increase as the frame size increases. This is because of error propagation. If a bit error occurs, the adaptive algorithm may diverge from its proper state giving bit errors for the rest of the frame. Thus, higher bit error rates occur for adaptive equalisers applied to systems such as ASTRO than for systems with more regular training sequences. In systems such as ASTRO simulcast systems, it is desirable to have an adaptive equaliser so that higher propagation delays between signals arriving from different transmitters may be tolerated, thus, increasing simulcast site separations while providing acceptable bit error rate performance.

Furthermore, it is desirable to allow the design of systems with fewer training sequences for equalisation which gives the benefit of reduced overhead and hence more capacity for user data.

SUMMARY OF THE INVENTION

According to the present invention, an apparatus and a method is provided for processing digital signals in a communications system including a non-equaliser detector and a equaliser each for receiving an input signal and outputting a quality estimate and bit decision, respectively, so that the quality estimates are compared and a bit decision is made based on the comparison.

In an alternative embodiment, the apparatus and method further include retraining the equaliser based on the comparison of the quality estimates of the detector and equaliser.

DETAILED DESCRIPTION OF THE PREFERRED EMBODIMENT

Figure 1:
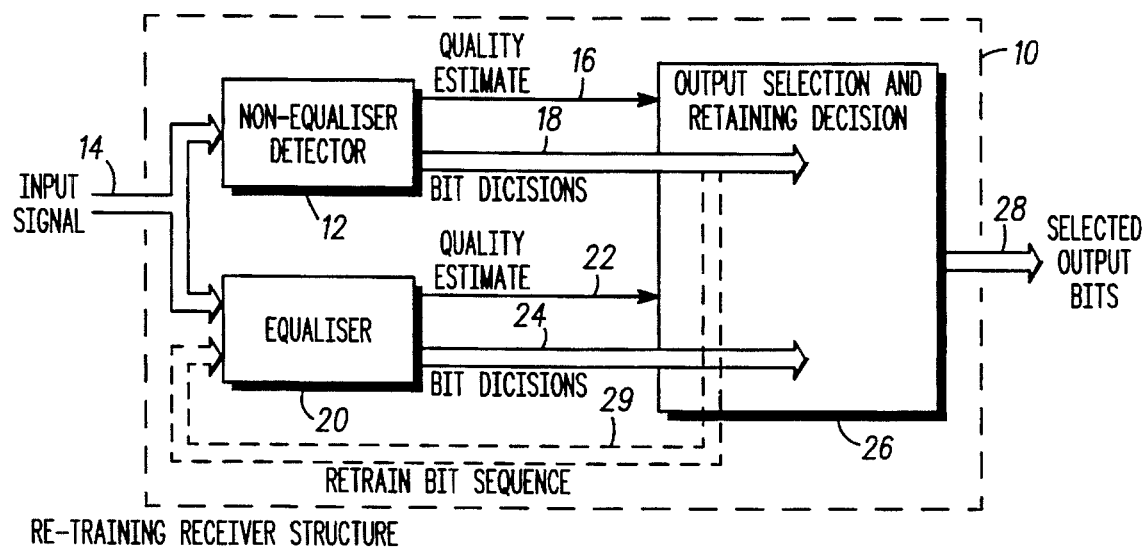
FIG. 1 shows a block diagram of a digital signal processor according to the present invention.

Referring to FIG. 1, there is shown a block diagram of a digital signal processor 10 for use in a receiver in a digital communications system. The digital signal processor 10 comprises a non-equaliser detector 12, an equaliser 20, and a decision and comparison means 26. The non-equaliser detector 12 includes an input to receive a first input signal 14 and delivers to a first output a first quality estimate 16 and delivers to a second output a first bit decision 18.

The equaliser 20 includes at least one input for receiving the first input signal 14 and delivering to a third output a second quality estimate 22 and delivering to a fourth output a second bit decision 24.

The decision and comparison means 26 may also be referred to as an output selection and retraining decision means that includes a comparison means for comparing the first quality estimate 16 with the second quality estimate 22 and delivers to a final output a third bit decision 28 based on the comparison.

According to the present invention, the third bit decision 28 may be either the first bit decision 18 or the second bit decision 24. The decision and comparison means 26 also includes a decision means for determining retraining of the equaliser based on the comparison of the first quality estimate 16 and the second quality estimate 22. The term "retraining" is used to indicate training of the equaliser between the known training sequences.

An alternative embodiment of the present invention includes a first comparison means for comparing the first quality estimate 16 with a first threshold value and a second comparison means for comparing the second quality estimate 22 with a second threshold value. A decision means for the alternative embodiment then delivers to a final output a third bit decision based on the first comparison means and the second comparison means and also includes a decision means for determining retraining of the equaliser based on the first comparison means and the second comparison means. The non-equaliser detector, equaliser, comparison means and the decision means may be implemented in hardware, software or a combination of both.

In a receiver for a digital communications system the receiver front end receives a communications signal and processes the communications signal so that an input signal 14 may be received by a digital signal processor 10. The input signals to the digital signal processor 10 may be described in terms of time frames.

Figure 2:
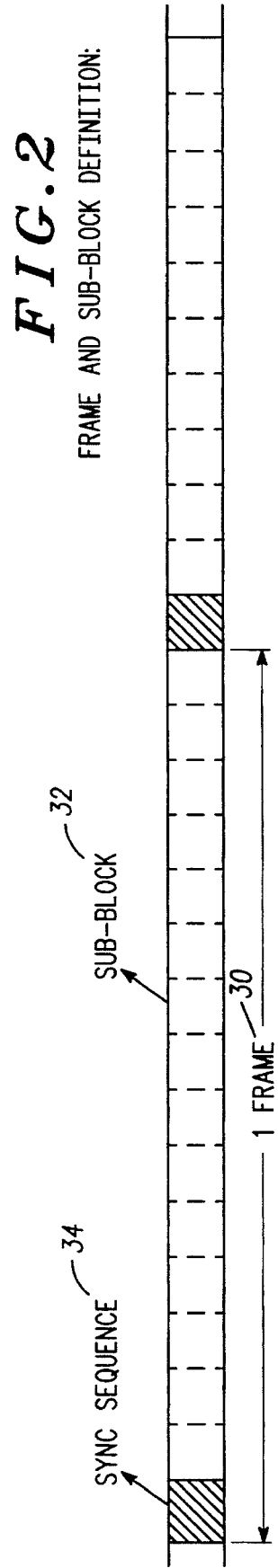
FIG. 2 is a frame and sub-block description according to an embodiment of the present invention.

FIG. 2 shows a time frame 30 and sub-block 32 definition according to an embodiment of the present invention. Synchronisation information is sent at the beginning of a time frame 30 in a synchronisation sequence 34. The synchronisation sequence 34 is followed by a block of data signals which is divided by the digital signal processor into a number of sub-blocks 32.

Figure 3:
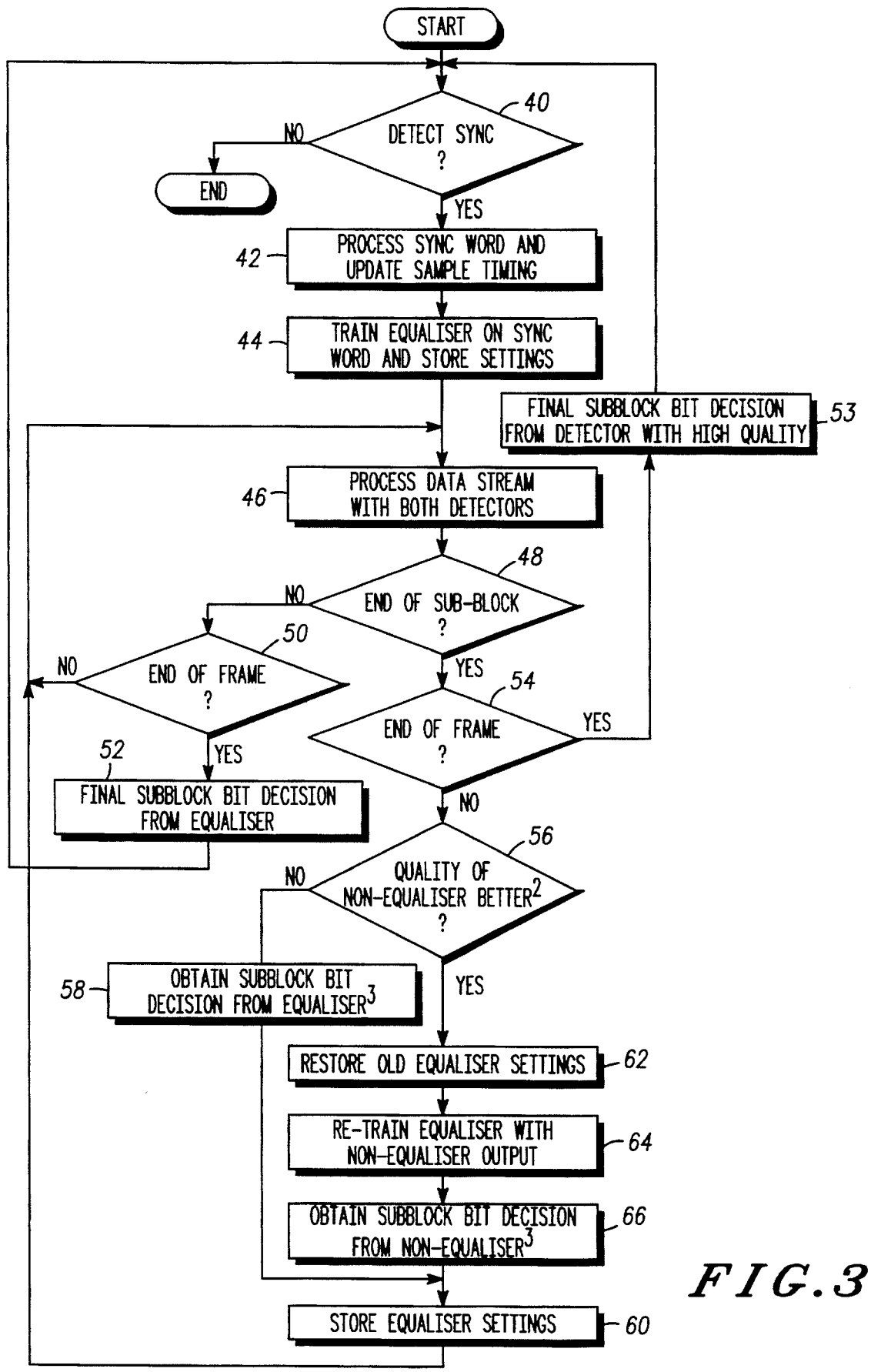
FIG. 3 is a flow chart according to an embodiment of the present invention.

FIG. 3 shows a flow chart for a preferred embodiment of the present invention. In a preferred embodiment of the present invention, an input signal 14 is received at an input of the digital signal processor 10. The digital signal processor 10 detects whether the input signal 14 is a synchronisation signal as in step 40. If the input signal 14 is a synchronisation signal then the digital signal processor processes the synchronisation word and updates sample timing as in step 42.

The equaliser 20 is then trained on the synchronisation word and the respective equaliser settings are stored as in step 44. The data stream from the input signal is processed with both the non-equaliser detector 12 and the equaliser 20 as in step 46 until an end of a sub-block is determined as in step 48 or an end of a frame is determined as in step 50. If an end of a frame is determined as in step 50 final sub-block bit decisions 28 are outputted from the digital signal processor 10 which are equal to the final sub-block bit decisions 24 from the equaliser 20.

If an end of a sub-block is determined as in step 48 and an end of a frame is determined in step 54 then final sub-block bit decisions 28 are determined by whether the equaliser sub-block bit decisions 24 or the non-equaliser detector bit decisions 18 have a higher respective quality estimate 16, 22 as in step 53.

If it is determined that it is not the end of a frame as in step 54 then a comparison means compares respective quality estimates of bit decisions of the non-equaliser detector 12 with the equaliser 20 over the same signal samples. If the quality estimate 16 of the non-equaliser detector 12 is better as determined in step 56 then the old equaliser settings are recalled as in step 62 and the equaliser is retrained 29 with the non-equaliser detector respective bit decisions 18 as in step 64. The final sub-block bit decisions 28 are selected from the non-equaliser detector 12 as in step 66. Thus, the final output bit decisions 28 are equal to the non-equaliser detector bit decisions 18. The equaliser settings are then stored as in step 60.

If the quality of the non-equaliser detector is not better as determined in step 56 the final sub-block decisions are obtained from the equaliser 20 as in step 58. The final bit decisions from the equaliser 20 may be delayed.

Figure 4:
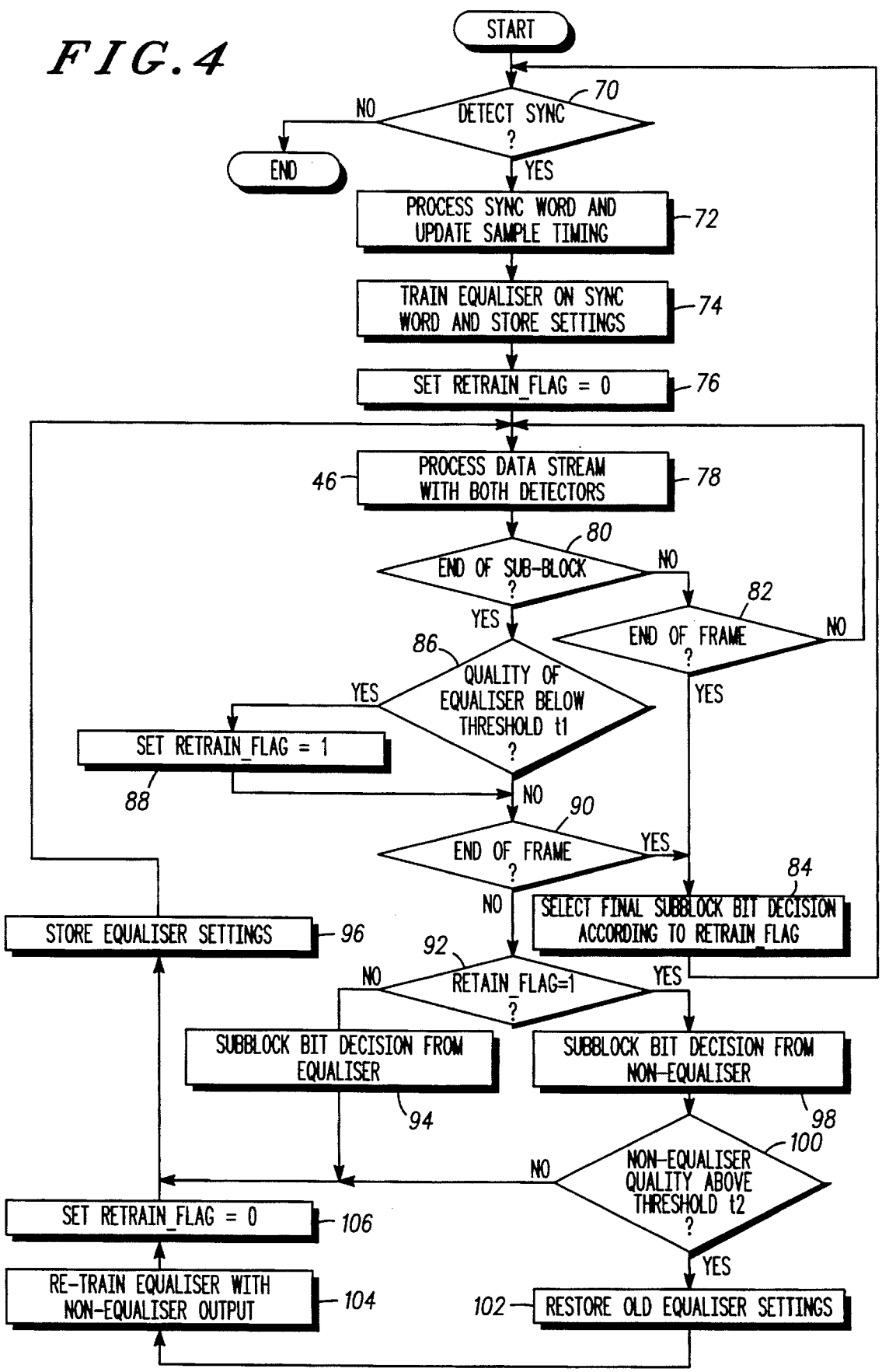
FIG. 4 is a flow chart for an alternative embodiment of the present invention.

FIG. 4 shows a flow chart for an alternative embodiment according to the present invention. If the input signal 14 is a synchronisation signal as determined in step 70 then the digital signal processor processes the synchronisation word and updates sample timing as in step 72.

The equaliser 20 is trained on the synchronisation word and the respective equaliser settings are stored as in step 74. A retrain flag is set to zero in step 76. The data stream from the input signal is processed by both the non-equaliser detector 12 and the equaliser 20 as in step 78 until an end of a sub-block is determined as in step 80 or an end of a frame is determined as in step 82. If an end of a frame is determined as in step 82 then the final sub-block decisions 28 are determined according to the retrain flag as in step 84. For example, if the retrain flag is set at zero then the final sub-block bit decisions 28 are determined from the equaliser 20 in which case they would be equal to the bit decisions 24 from the equaliser 20.

If it is determined as in step 80 that it is the end of a sub-block then the quality estimate 22 of the equaliser 20 is compared to a first threshold value as in step 86. If the quality estimate 22 of the equaliser 20 is below the first threshold value as determined in step 86 then the retrain flag is set to 1. If not, it is determined whether the input signal is at the end of a frame as in step 90.

If the input signal is at the end of a frame as determined by step 90 the final sub-block bit decisions are selected according to the retrain flag as in step 84.

If the input signal is not at the end of a frame as determined in step 90, it is then determined if the retrain flag is set as in step 92. If the retrain flag is not set then the final sub-block decisions 28 are determined from the equaliser bit decisions 24 as in step 94. Then the equaliser settings are stored as in step 96.

If the retrain flag is set (i.e. equal to 1) then the final sub-block decisions 28 are determined from the non-equaliser detector bit decisions 18 as in step 98.

The non-equaliser detector quality estimate 16 is then compared to a second threshold value. If it is determined as in step 100 that the non-equaliser detector quality estimate 16 is above the threshold value the previous equaliser 20 settings are recalled as in step 102 and the equaliser is retrained with the non-equaliser detector output as in step 104. Thus, the final bit decisions 28 are determined from the non-equaliser detector bit decisions 18 which are fed back and used as a reference signal to retrain the equaliser. The retrain flag is set to 0 as in step 106 and the equaliser settings are stored as in step 96. If in step 100 it is determined that the non-equaliser detector quality estimate 16 is below the second threshold value then the equaliser settings are stored as in step 96 and processing of the next sub-block takes place as in step 78.

Figure 5:
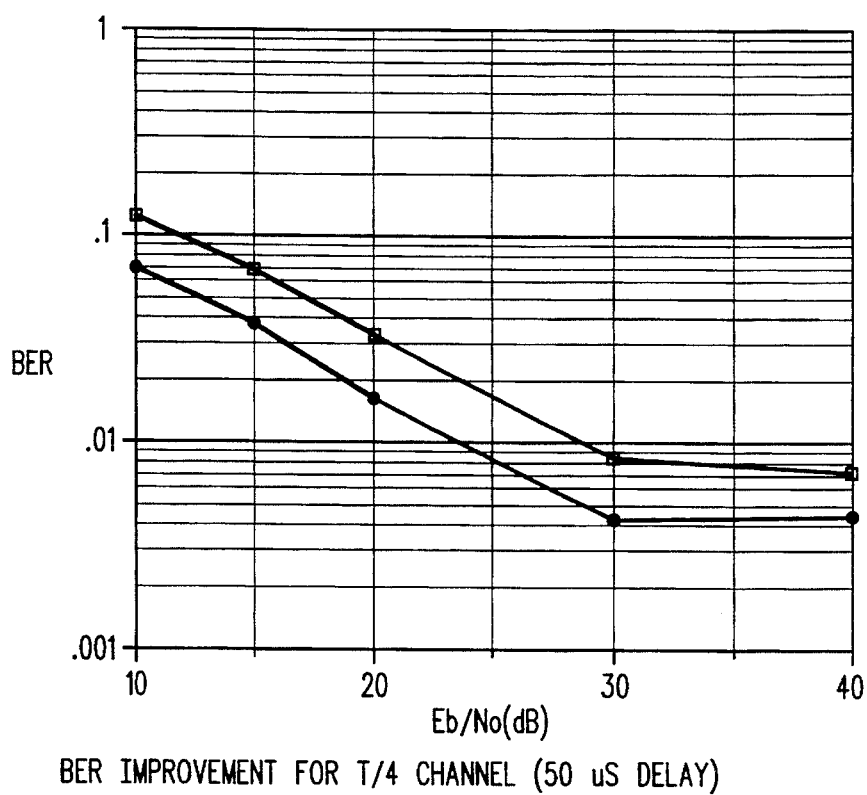
FIG. 5 is a chart showing the results of a preferred embodiment of the present invention.
Figure 6:
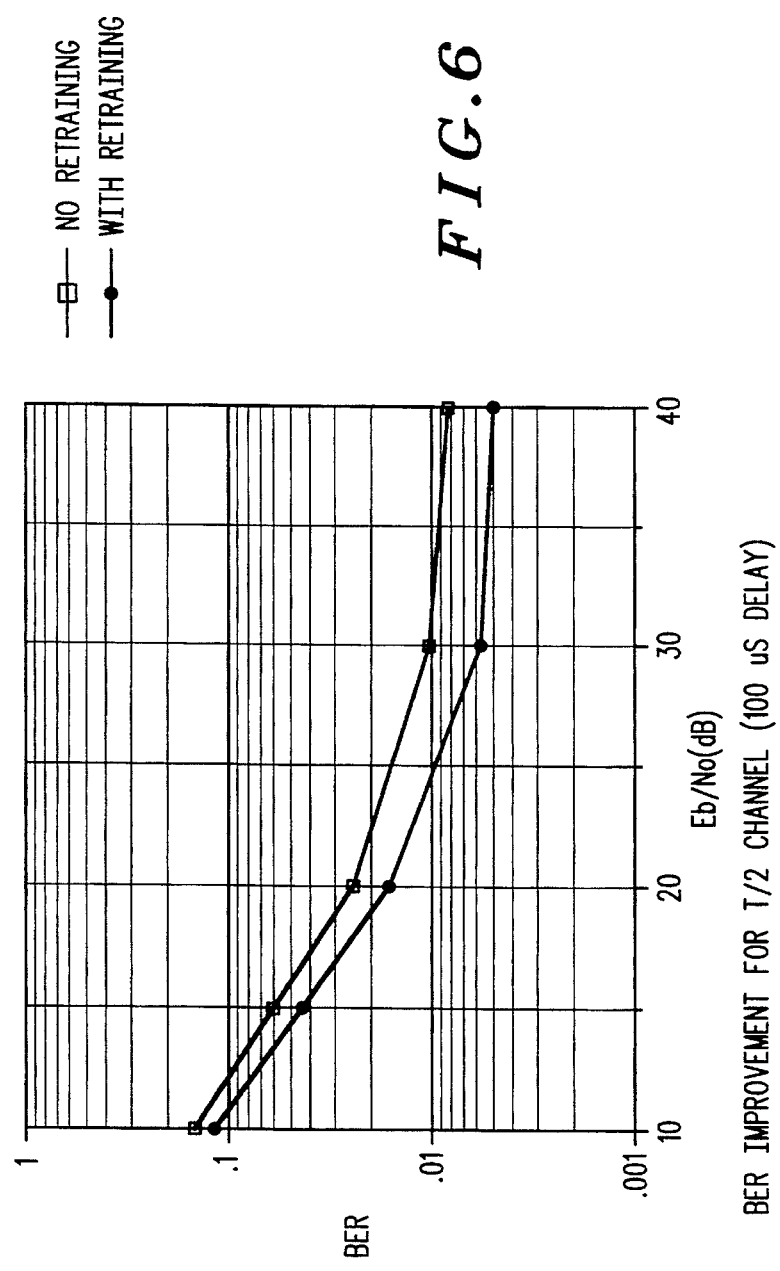
FIG. 6 is a chart showing the results of an alternative embodiment of the present invention.

FIGS. 5 and 6 show simulation results for a system with the following parameters:

Modulation=pi/4 DQPSK

Symbol rate=9.6 kb/s

Frame structure=28 bits sync+1632 bits data

Fading=Rayleigh on each path, 16 Hz Doppler

Equaliser=Maximum Likelihood Sequence Estimator (MLSE) with LMS channel estimator and prediction, 16 state Viterbi processing.

Non-equaliser detector=coherent detector

Retraining algorithm=Sub-block size 48 bits

Quality measure=error measurement of LMS channel tracking algorithm (for both detectors)

Stored equaliser settings=16 states+path histories in trellis

FIG. 5 shows a significant performance improvement that occurs when re-training takes place according to the preferred embodiment of the present invention or the relative quality method where the quality estimates of the equaliser and the non-equaliser detector are compared for the same input signal over a sub-block. The multipath channel is modelled as a two ray channel where the second ray is delayed by T/4 where T is the modulation symbol time. The performance improves by at least 4dB over a range of Eb/No (which is a measure of signal to noise ratio).

FIG. 6 shows the performance when retraining takes place according to the alternative embodiment or the absolute quality threshold method. The multipath channel is more severe and is modelled as a two ray channel with a delay of T/2 where T is the modulation symbol time. The performance improves over a wide range of Eb/No (signal to noise ratio) and is more apparent at higher signal to noise ratios.

The present invention provides an apparatus and a method that allow the equalisation of multipath propagation delays arising in digital communications systems, particularly simulcast systems, where signals are arriving at a receiver from different transmitters and where training sequences are infrequent. This allows larger site separations and thus reduces installation and operational costs of such systems. In addition, the invention allows the design of systems with fewer training sequences for equalisation which gives the benefit of reduced overhead and hence more capacity for user data.

I claim:

1. A digital signal processor for use in a receiver in a digital communications system, the digital signal processor comprising:

a non-equaliser detector having an input for receiving a first input signal and delivering to a first output a first quality estimate and delivering to a second output a first bit decision;

an equaliser having at least one input for receiving the first input signal and delivering to a third output a second quality estimate and delivering to a fourth output a second bit decision;

comparison means for comparing the first quality estimate with the second quality estimate and delivering to a final output a third bit decision based on the comparison; and decision means for determining retraining of the equaliser based on the comparison of the first quality estimate and the second quality estimate, wherein the first quality estimate and the second quality estimate are measured over a sub-block of input signal duration and the third bit decision and retraining decision are made at the end of the sub-block.

2. The digital signal processor of claim 1, further comprising:

means for retraining the equaliser by inputting the first bit decision at an input of the equaliser.

3. The digital signal processor of claim 1, wherein the third bit decision is equal to the first bit decision or the second bit decision.

4. The digital signal processor of claim 1, further comprising:

storage means for storing equaliser settings at an end of each sub-block for recalling when retraining occurs.

5. The digital signal processor of claim 1, further comprising:

buffering means for allowing differing delays of bit decisions and quality estimates between the non-equaliser detector and the equaliser.

6. The digital signal processor of claim 1, further comprising:

buffering means for allowing the second bit decision and the third bit decision to be made at a later time than the first quality estimate and the second quality estimate.

7. A method for processing data signals in a receiver for a digital communications system comprising the steps of:

receiving a first data signal at a detector and outputting a first quality estimate and a first bit decision;

receiving the first data signal at an equaliser and outputting a second quality estimate and a second bit decision;

comparing the first quality estimate with the second quality estimate;

outputting a third bit decision based on the comparison of the first quality estimate with the second quality estimate; and retraining the equaliser based on the comparison of the first quality estimate with the second quality estimate, wherein the quality estimates are measured over a sub-block of input signal duration and the third bit decision and retraining decision are made at the end of the sub-block.

8. The method of claim 7, further comprising the step of:

retraining the equaliser by inputting the first bit decision at an input of the equaliser.

9. The method of claim 7, wherein the third bit decision is equal to the first bit decision or the second bit decision.

10. The method of claim 7, further comprising the step of:

storing equaliser settings at the end of each sub-block for recalling when retraining occurs.

11. The method of claim 7, further comprising the step of:

buffering in a first buffering means to allow for differing delays of bit decisions and quality estimates between the detector and the equaliser.

12. The method of claim 7, further comprising the step of:

buffering in a second buffering means to allow for the second bit decision and the third bit decision to be made at a later time than the first quality estimate and the second quality estimate.

* * * * *

UNITED STATES PATENT AND TRADEMARK OFFICE
CERTIFICATE OF CORRECTION

PATENT NO.   : 5,586,143
DATED        : December 17, 1996
INVENTOR(S)  : Nicholas W. Whinnett It is certified that error appears in the above-indentified patent and that said Letters Patent is hereby corrected as shown below:

In the abstract, line 1, please delete the words "as shown in".

In FIG. 1, amend two occurrences of "DICISIONS" to read --DECISIONS--, and amend term "RETAINING" in block 26 to read --RETRAINING--.

In FIG. 3, amend the term "HIGH" in block 53 to read --HIGHER--, amend the term "DECISION" in blocks 52, 53, 58, and 66 to read --DECISIONS--, amend the term "BETTER [superscript 2]" in block 56 to read --BETTER--, and amend the term "EQUALISER [superscript 3]" in blocks 58 and 66 to read --EQUALISER--.

In FIG. 4, amend the term "RETAIN" in block 92 to read --RETRAIN--.

Signed and Sealed this

Thirteenth Day of May, 1997

Attest:

BRUCE LEHMAN

Attesting Officer            Commissioner of Patents and Trademarks